Figures 1, 2:
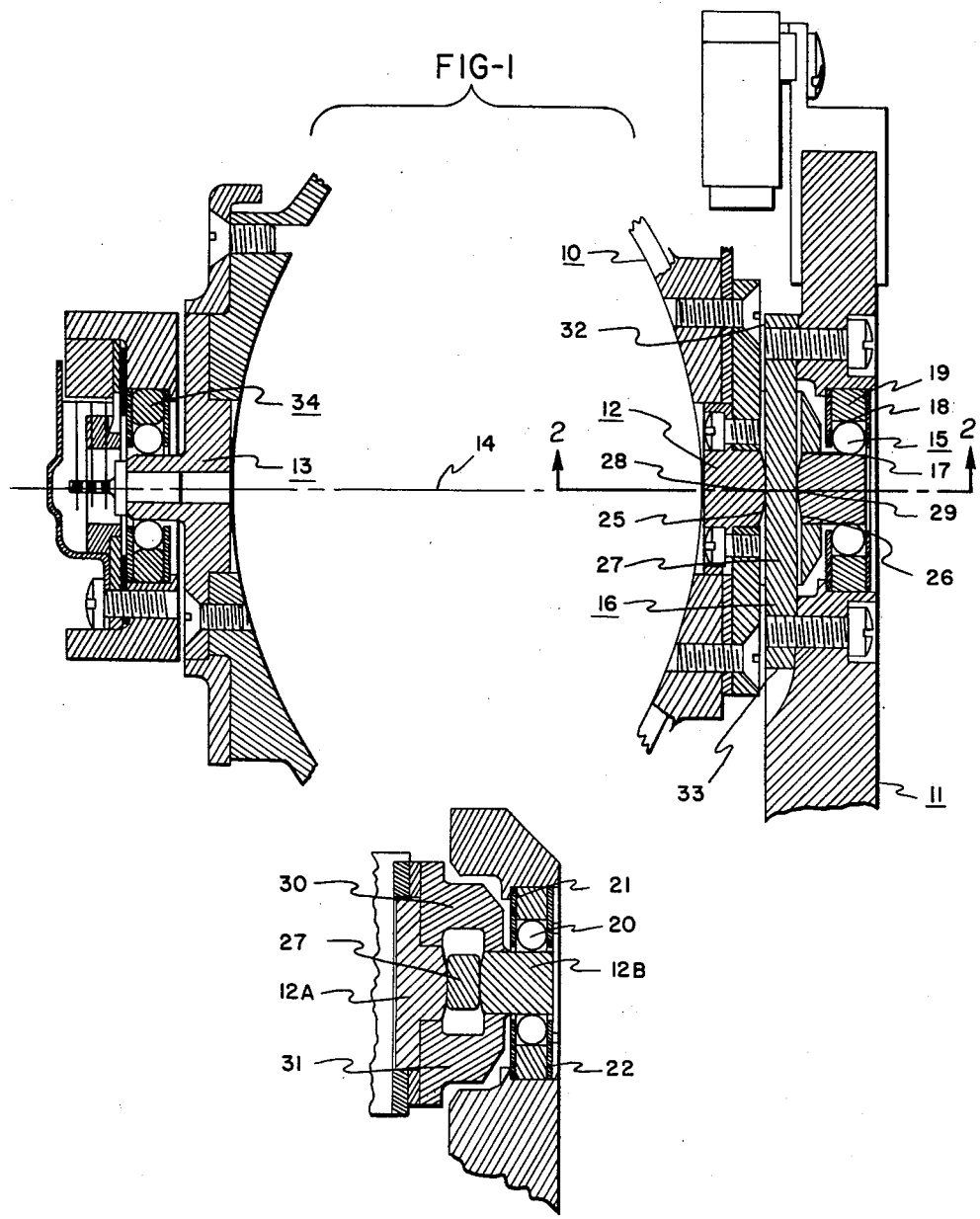

March 24, 1964  F. W. HERR  3,126,231
AXIAL-RADIAL BEARING FOR GYROSCOPE TRUNNIONS
Original Filed June 25, 1957

INVENTOR.
Frederick W. Herr
BY
Clyde H. Haynes
his Atty

United States Patent Office 3,126,231
Patented Mar. 24, 1964

3,126,231
AXIAL-RADIAL BEARING FOR GYROSCOPE
TRUNNIONS
Frederick W. Herr, Grand Rapids, Mich., assignor to Lear Siegler, Inc., Santa Monica, Calif., a corporation of Delaware
Continuation of application Ser. No. 667,810, June 25, 1957. This application Dec. 26, 1961, Ser. No. 162,157
1 Claim. (Cl. 308—35)

The present invention relates to bearings and to combination of radial and axial tthrust bearings wherein radial thrust is received by one portion of a bearing and axial thrust by another portion of the bearing. The invention is particularly adapted to gyros in which the gyro housing rotates through very small angles and in which the loading of the bearing may be in any direction relative to the bearing axis.

This application is a continuation of application bearing Serial No. 667,810, filed June 25, 1957, now abandoned, for Axial-Radial Bearing for Gyroscope Trunnions.

In the past, attempts have been made to divide axial and radial forces on bearings so that one part of the entire bearing structure accepted or received radial thrust and another part accepted or received axial thrust of the rotating supported member. An example of such structure is disclosed in Patent No. 2,253,119 issued to J. Goerth on August 19, 1941.

It has been found that such prior bearings and conventional bearings with curved races in which the bearing members received both axial and radial forces do not give satisfactory performance. It is believed that this unsatisfactory performance is due to skidding of the balls, since each ball is constrained by the curvature of the race or races to rotate about a polar axis which is not parallel to the trunnion axis. Such rotation of the balls, when coupled with elastic deformation of the balls and races under load, results in the establishment of torques about the trunnion axis of the gyro, such torques being generated within the bearing structure itself. Any torques so generated directly result in drift of the gyro, thus establishing errors and faulty readings or signals from the gyros.

The present invention has for its principal object the overcoming of the deficiencies in the prior bearing assemblies as well as the elimination of the problems resulting therefrom.

A further object of the present invention is to provide bearing structure which is new, novel, economical to manufacture and efficient in operation.

A further object of the invention is to provide a bearing support for trunnions wherein axial thrust is restrained by one portion of the bearing and radial thrust by another portion of the bearing.

A further object of the invention is to provide an improved bearing for gyros by separating the radial and thrust loads on the bearing through the use of cylindrical inner and outer races and a separate axial thrust bearing so that pure rolling of each of the balls about an axis parallel to the trunnion axis is obtained to eliminate skidding of the balls on the races and to thereby eliminate the establishment of torques which might cause drifting of the gyro.

A further object of the invention is to provide a gyro with bearings which do not cause drifting of the gyro.

Other objects of the present invention will become apparent from a fuller understanding of the structure used in carrying out the invention and as is more fully described. In this structure there is a supporting member and a supported member having an axis of rotation. These members have concentrically aligned cylindrical surfaces radially spaced apart and facing each other. A plurality of balls in bearing contact with these surfaces are guided for annular movement by guide means on both sides of said balls. Axial thrust forces are received by providing one of the members with convex surfaces facing each other and the other of the members with an axial thrust bar extending between those convex surfaces. The bar has opposite parallel flat surfaces with each flat surface bearingly contacting its respective one of the convex surfaces on the axis of rotation of the supported member to restrain the supported member against axial movement.

For purposes of exemplification and not of limitation, a specific example of a preferred modification of the invention now will be more fully described and is illustrated in the accompanying drawing in which:

FIGURE 1 is a plan view partly in section of the preferred bearing construction; and FIGURE 2 is a section view taken along the line 2—2 of FIGURE 1.

The preferred embodiment of the invention is illustrated for bearingly supporting a rotor housing 10 in a gyro gimball 11 by means of trunnions 12 and 13 bearingly mounted in the gimbal or other suitable supporting member 11. The trunnions or supported members or elements 12 and 13 have a common axis 14 about which the rotor housing may at least partially rotate relative to the supporting member 11. As illustrated on the right hand side of FIGURE 1, the trunnion 12 serves as the supported member bearingly mounted in supporting member 11 by the cooperative combination of radial thrust bearing structure 15 and axial thrust bearing structure 16.

The radial thrust bearing structure 15 comprises concentrically aligned cylindrical surfaces 17 and 18 which are radially spaced apart and facing each other, the surface 17 being provided by the trunnion 12 and surface 18 being provided by a ring part 19. The radial thrust bearing 15 is completed by a plurality of spherical balls 20 in bearing contact with the surfaces 17 and 18, and annular flat axially spaced plates 21 and 22 carried by ring 19 to guide the ball for annular movement and restrain the balls against substantially axial movement relative to the surface 18 and the axis 14. The plates 21 and 22 are disposed one on each axial side of the balls 20 and extend a sufficient distance across the space between the surfaces 17 and 18 so as to contact the balls 20 intermediate the cylindrical surfaces. In other words, the plates 21 and 22 engage the balls 20 on their theoretical axis of rotation as they roll in an annular direction between the surfaces 17 and 18 of the supporting and supported members.

Best results have been observed when the clearance between balls 20 and plates 21 and 22 is in the neighborhood of .001" to .002" of an inch and the cylindrical surfaces 17 and 18 are of tungsten carbide or similar material which has a high modulus of elasticity. Since the surfaces 17 and 18 are continuous cylindrical surfaces, they provide no restraint against axial movement of the trunnion 12 and the bearing 15 operates entirely and only as a radial thrust bearing.

The axial thrust bearing portion 16 is obtained by providing the trunnion or rotative member 12 with convex surfaces 25 and 26 facing each other and providing the supporting member 11 with a thrust bar 27 which extends between these surfaces and is in bearing contact therewith. The thrust bar 27 has opposite parallel flat surfaces 28 and 29 in bearing contact with convex surfaces 25 and 26 respectively on the axis 14 of trunnion 12. The convex surfaces 25 and 26 may be somewhat spheroidal with a radius greater than the diameter of the trunnion or of such other convex shape as desired. Since the flat surfaces 28 and 29 are in bearing contact with the convex surfaces 25 and 26 on the axis of rotation of the rotatable member, the thrust bar 27 receives only axial thrust forces in either or both directions of thrust.

As is best illustrated in FIGURE 2, the surfaces 25 and 26 on the trunnion 12 are easily provided by aligning trunnions parts 12a and 12b in a spaced end to end axial relationship and bridging the gap therebetween by means of diametrically opposite bridges 30 and 31. The parts 12a and 12b and the bridges 30 and 31 may be brazed, soldered or otherwise joined into a unitary structure forming the trunnion. The thrust bar 27 extends radially outward between the bridges 30 and 31 and has its opposite ends 32 and 33 secured by bolts or other suitable means to the supporting member 11.

It has been found that the rotor housing on gyroscopes expands as it is heated to running temperature. This expansion is permitted with the present bearing structure since all axial thrust is received on one side only of the rotor housing 10 by axial thrust bearing 16. Since the axial thrust bearing portion of the support for trunnion 12 controls axial thrust in both directions, it is only necessary to provide a radial thrust bearing for trunnion 13. The radial thrust bearing 34 for trunnion 13 is at least similar to the radial thrust bearing 15 and many be identical or substantially identical thereto and operates on the same principles and in the same manner as the bearing 15. Because of this, the details of construction of the radial thrust bearing 34 and trunnion 13 will not be more fully described. Trunnion 13 is allowed to move axially in radial thrust bearing 34 in distances as dicated by the expansion of the rotor housing 10. Since the bearings 15 and 16 supporting trunnion 12 are in no way responsive to or effected by temperature changes of the rotor housing 10, these bearings may be very accurately adjusted during manufacture without allowing for expansion or contraction tolerances.

It is apparent from the foregoing description of the preferred embodiment of the invention as illustrated that the radial thrust bearing portion receives and accepts only radial thrust of the trunnion and that the axial thrust bearing portion receives and accepts only axial thrust in either and/or both directions along the axis of rotation.

The present embodiment of the invention thus carries out the objects of the invention and overcomes the deficiencies and problems encountered with prior constructions. It is understood that various modifications of the details and arrangements of parts may be had without departing from the spirit and scope of the invention as hereinafter claimed.

I claim:

In cooperative combination:

a supporting member;

a supported member rotatably supported relative to said supporting member for rotation about a predetermined axis of rotation, said supported member being radially supported between a pair of concentrically aligned right circular cylindrical surfaces, radially spaced apart and facing each other, said cylindrical surfaces having a plurality of balls in bearing contact therewith, said cylindrical surfaces having guide means axially spaced apart and having planar surfaces perpendicular to said axis and positioned upon opposing sides of said balls but spaced therefrom for guiding said balls for annular movement, said balls being permitted limited axial rolling motion, means integral with said supported member for axially supporting said supported member relative to said supporting member, said axially supporting means having a passage therethrough defined by a plurality of internal surfaces of said axially supporting means including first and second surfaces normal to and bisecting said predetermined axis of rotation, said first and second surfaces being convex in shape, a thrust bar passing through said passage and attached at both ends to said supporting member and wherein said thrust bar contacts said convex surfaces, said thrust bar having parallel flat surfaces at the axially bearing contact points with said convex surfaces to carry the axial thrust of said supported member relative to said supporting member.

References Cited in the file of this patent

UNITED STATES PATENTS

| | | |
|---|---|---|
| 1,837,601 | Wetzel | Dec. 22, 1931 |
| 2,253,119 | Georth | Aug. 19, 1941 |
| 2,334,002 | Heintz et al. | Nov. 9, 1943 |